US010095233B2

(12) United States Patent
Nguyen et al.

(10) Patent No.: US 10,095,233 B2
(45) Date of Patent: Oct. 9, 2018

(54) MOBILE ROBOTIC SYSTEM FOR GUIDING AN AUTOMATED VEHICLE ALONG A RECONFIGURABLE CONTINUOUS PATH DEFINED BY A FLOOR ASSEMBLY AND METHOD THEREOF

(71) Applicant: The Boeing Company, Chicago, IL (US)

(72) Inventors: Tuong Q. Nguyen, Bellevue, WA (US); John W. Pringle, IV, Gardena, CA (US)

(73) Assignee: The Boeing Company, Chicago, IL (US)

( * ) Notice: Subject to any disclaimer, the term of this patent is extended or adjusted under 35 U.S.C. 154(b) by 448 days.

(21) Appl. No.: 14/753,353

(22) Filed: Jun. 29, 2015

(65) Prior Publication Data

US 2016/0378116 A1    Dec. 29, 2016

(51) Int. Cl.
*G01C 22/00* (2006.01)
*G05D 1/02* (2006.01)
*B25J 5/00* (2006.01)
*B25J 9/04* (2006.01)

(52) U.S. Cl.
CPC ............ *G05D 1/0212* (2013.01); *B25J 5/007* (2013.01); *B25J 9/046* (2013.01); *G05D 1/0263* (2013.01); *G05D 1/0265* (2013.01); *G05D 2201/0216* (2013.01)

(58) Field of Classification Search
CPC .......... G05D 1/0212; B25J 5/007; B25J 9/046
See application file for complete search history.

(56) References Cited

U.S. PATENT DOCUMENTS

| 4,518,307 | A | 5/1985 | Bloch | |
|---|---|---|---|---|
| 5,213,454 | A | 5/1993 | Givler et al. | |
| 6,514,018 | B2 | 2/2003 | Martinez et al. | |
| 8,676,426 | B1 | 3/2014 | Murphy | |
| 8,751,147 | B2 | 6/2014 | Colwell | |
| 2012/0006765 | A1* | 1/2012 | Tsujimoto | B65G 1/10 211/1.57 |
| 2014/0079525 | A1* | 3/2014 | Krimpmann | B25J 15/0616 414/797 |
| 2016/0365715 | A1* | 12/2016 | Coffman | H02G 3/385 |

* cited by examiner

*Primary Examiner* — Adam M Alharbi
(74) *Attorney, Agent, or Firm* — Walters & Wasylyna LLC

(57) ABSTRACT

A mobile robotic system may include an automated guided vehicle, and a floor assembly including a support surface and a reconfigurable pathway, wherein the automated guided vehicle is configured to travel on the support surface and follow the reconfigurable pathway.

22 Claims, 10 Drawing Sheets

MOBILE ROBOTIC SYSTEM FOR GUIDING AN AUTOMATED VEHICLE ALONG A RECONFIGURABLE CONTINUOUS PATH DEFINED BY A FLOOR ASSEMBLY AND METHOD THEREOF

FIELD

The present disclosure is generally related to apparatus and methods for guiding an automated guided vehicle ("AGV") and, more particularly, to apparatus and methods for guiding an AGV along a removable floor assembly having a reconfigurable pathway.

BACKGROUND

An automated guided vehicle ("AGV") may be used for a variety of tasks, such as to transport payloads along a predetermined route without a real-time human operator. As one example, an AGV may transport materials from one location to another along the predetermined route, for example, within a manufacturing facility, to allow various manufacturing operations to be performed on the materials.

One disadvantage of the use of an AGV is that the predetermined route travelled by the AGV is often fixed and immobile. As examples, the predetermined route may be formed by an electrified guide wire system that is integrated (e.g., buried) in the floor of the manufacturing facility or a guide rail system that is coupled to the floor. Due to the inflexibility of the predetermined route travelled by the AGV, areas accessible to the AGV and the overall utility of the AGV may be reduced.

Accordingly, those skilled in the art continue with research and development efforts in the field of guiding an AGV along a predetermined path.

SUMMARY

In one embodiment, the disclosed mobile robotic system may include an automated guided vehicle, and a floor assembly including a support surface and a reconfigurable pathway, wherein the automated guided vehicle is configured to travel on the support surface and follow the reconfigurable pathway.

In another embodiment, the disclosed mobile robotic system may include a floor assembly including a support surface and a reconfigurable pathway, wherein an automated guided vehicle travels on the support surface and follows the reconfigurable pathway.

In yet another embodiment, the disclosed method for guiding a mobile robotic system may include the steps of: (1) determining a travel path of an automated guided vehicle, (2) forming a floor assembly including a reconfigurable pathway producing a magnetic field, wherein the floor assembly is formed such that reconfigurable pathway matches the travel path of the automated guided vehicle, (3) detecting, by the automated guided vehicle, the magnetic field, and (4) navigating the automated guided vehicle along the reconfigurable pathway.

Other embodiments of the disclosed system, apparatus and method will become apparent from the following detailed description, the accompanying drawings and the appended claims.

DETAILED DESCRIPTION

Figure 1:
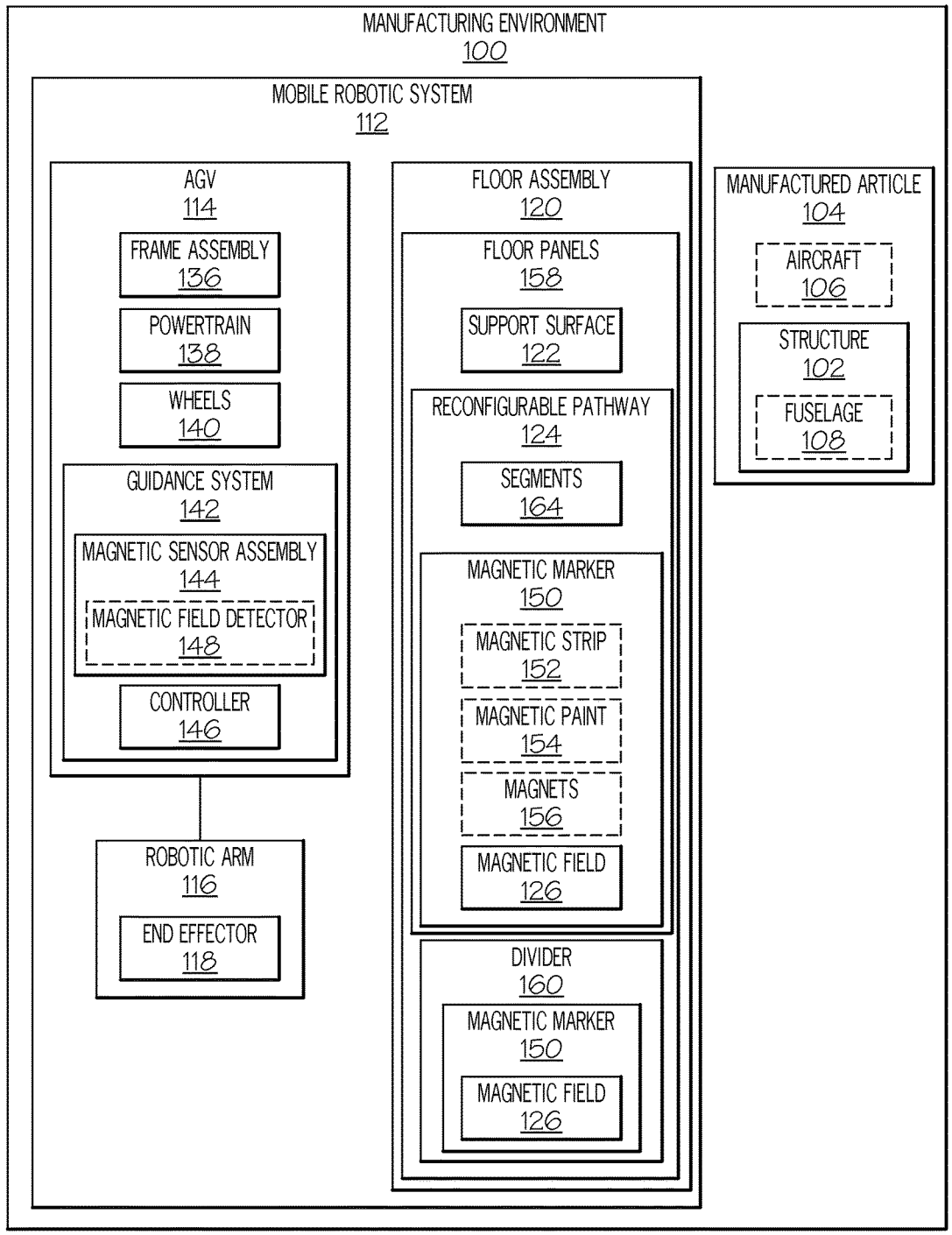
FIG. 1 is a schematic block diagram of one embodiment of a manufacturing environment.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 14:
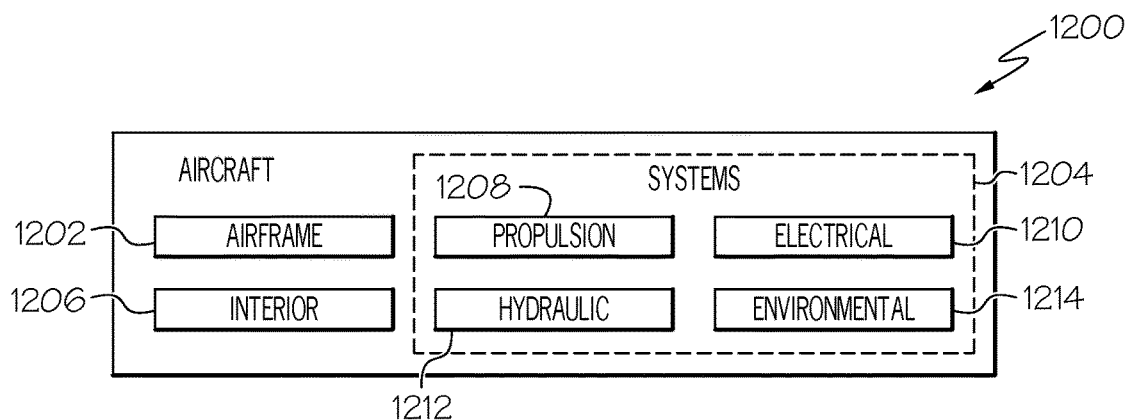
FIG. 14 is a schematic illustration of an aircraft.

In FIGS. 1 and 14, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1 and 14 may be combined in various ways without the need to include other features described in FIGS. 1 and 14, other drawing figures, and/or the accompanying disclosure, even though such combination or combinations are not explicitly illustrated herein. Similarly, additional features not limited to the examples presented, may be combined with some or all of the features shown and described herein.

Figure 12:
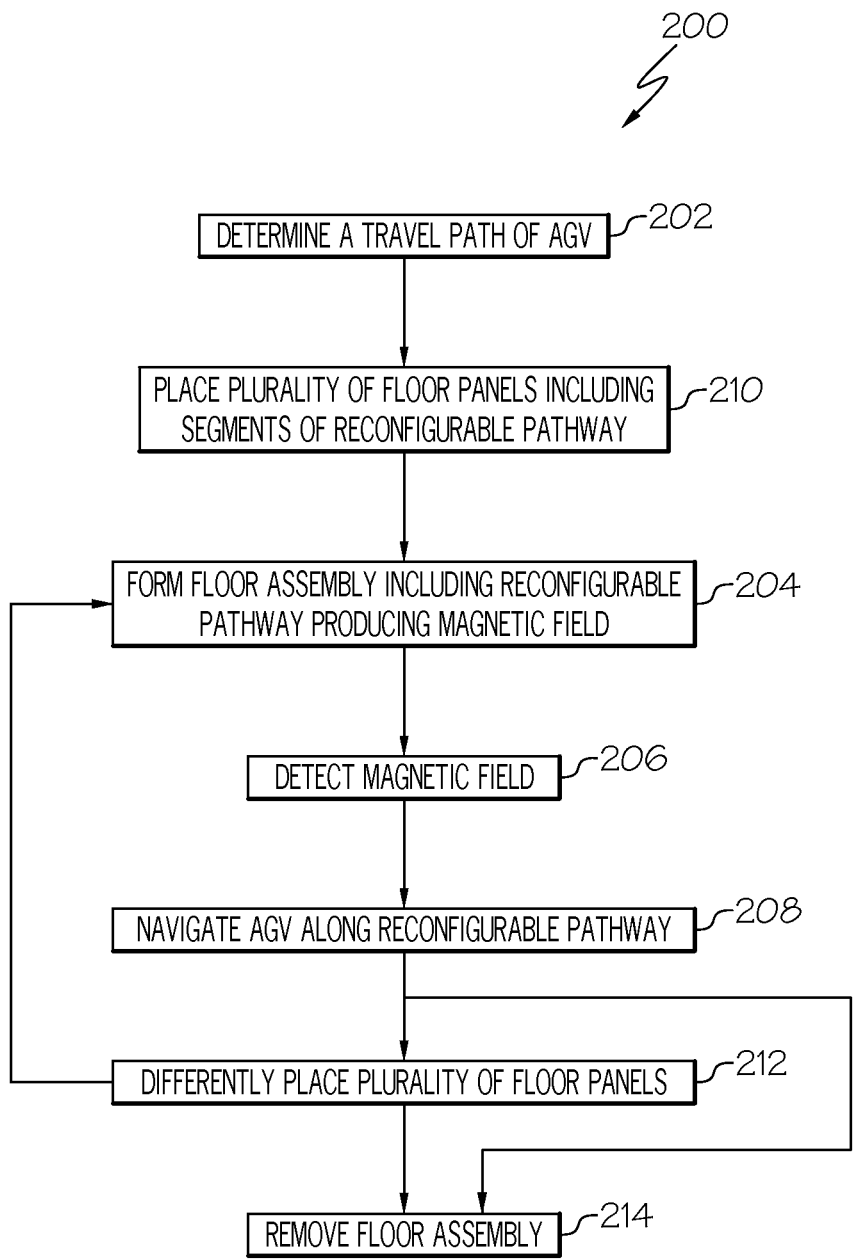
FIG. 12 is a flow diagram of one embodiment of a method for guiding a mobile robotic system.
Figure 13:
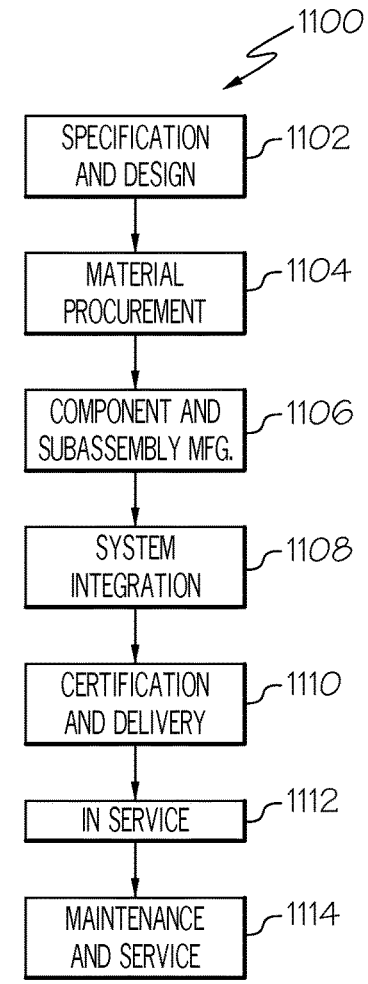
FIG. 13 is a block diagram of aircraft production and service methodology.

In FIGS. 12 and 13, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 12 and 13 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Reference herein to "example" means that one or more feature, structure, or characteristic described in connection with the example is included in at least one embodiment or implementation. The phrase "one example" or "another example" in various places in the specification may or may not be referring to the same example.

Referring to FIG. 1, one embodiment of manufacturing environment, generally designated 100, is disclosed. Manufacturing environment 100 may be any suitable workspace or facility where one or more manufacturing operations are performed on structure 102. Structure 102 may include one or more components of manufactured article 104. The manufacturing operation may be any operation or process performed during fabrication, assembly, finishing and/or inspection of structure 102 or manufactured article 104.

Figure 3:
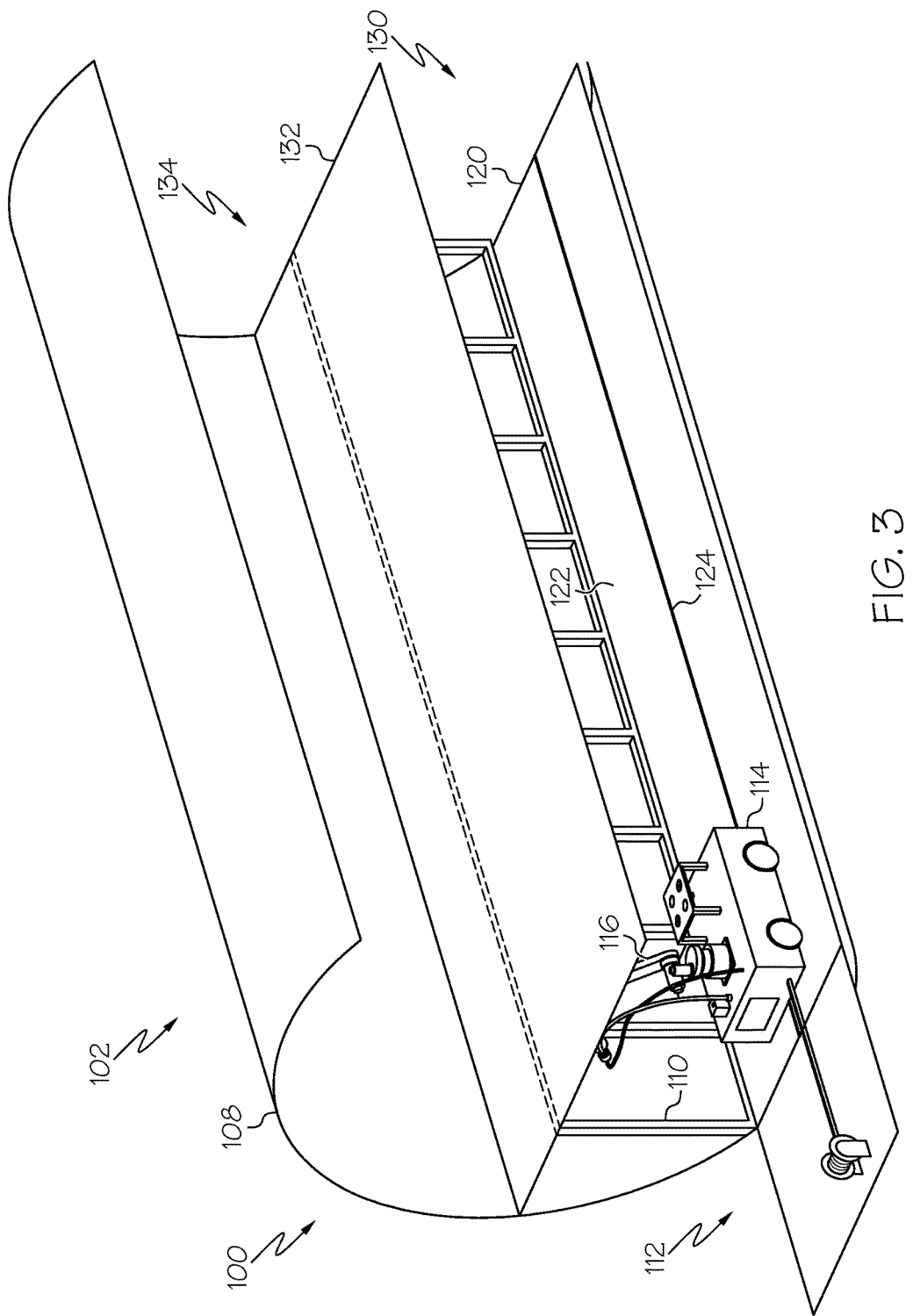
FIG. 3 is a schematic perspective view of a mobile robotic system of FIG. 1 illustrating one embodiment of a floor assembly including a reconfigurable pathway.
Figure 4:
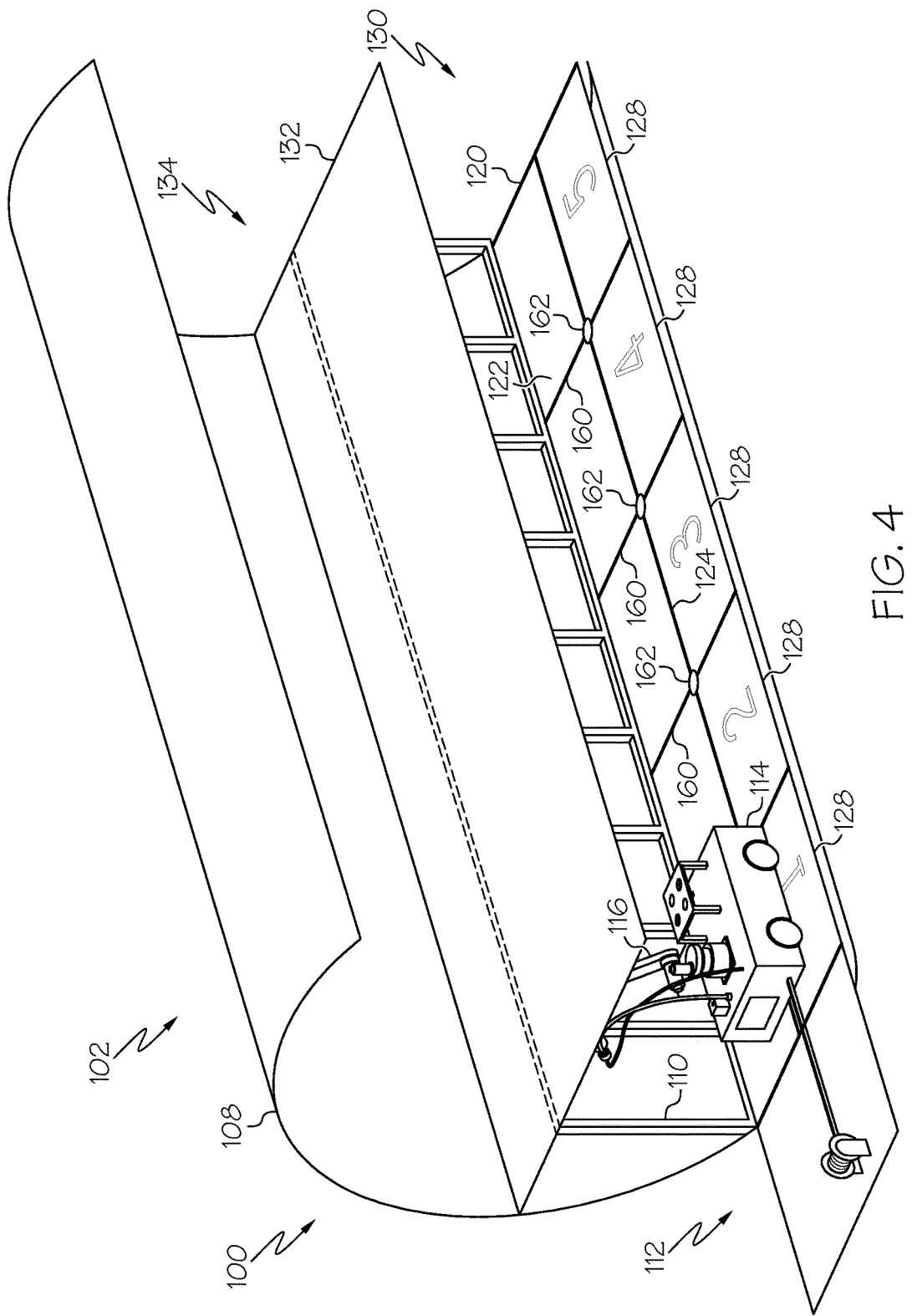
FIG. 4 is a schematic perspective view of the mobile robotic system of FIG. 1 illustrating another embodiment of the floor assembly including the reconfigurable pathway.
Figure 5:
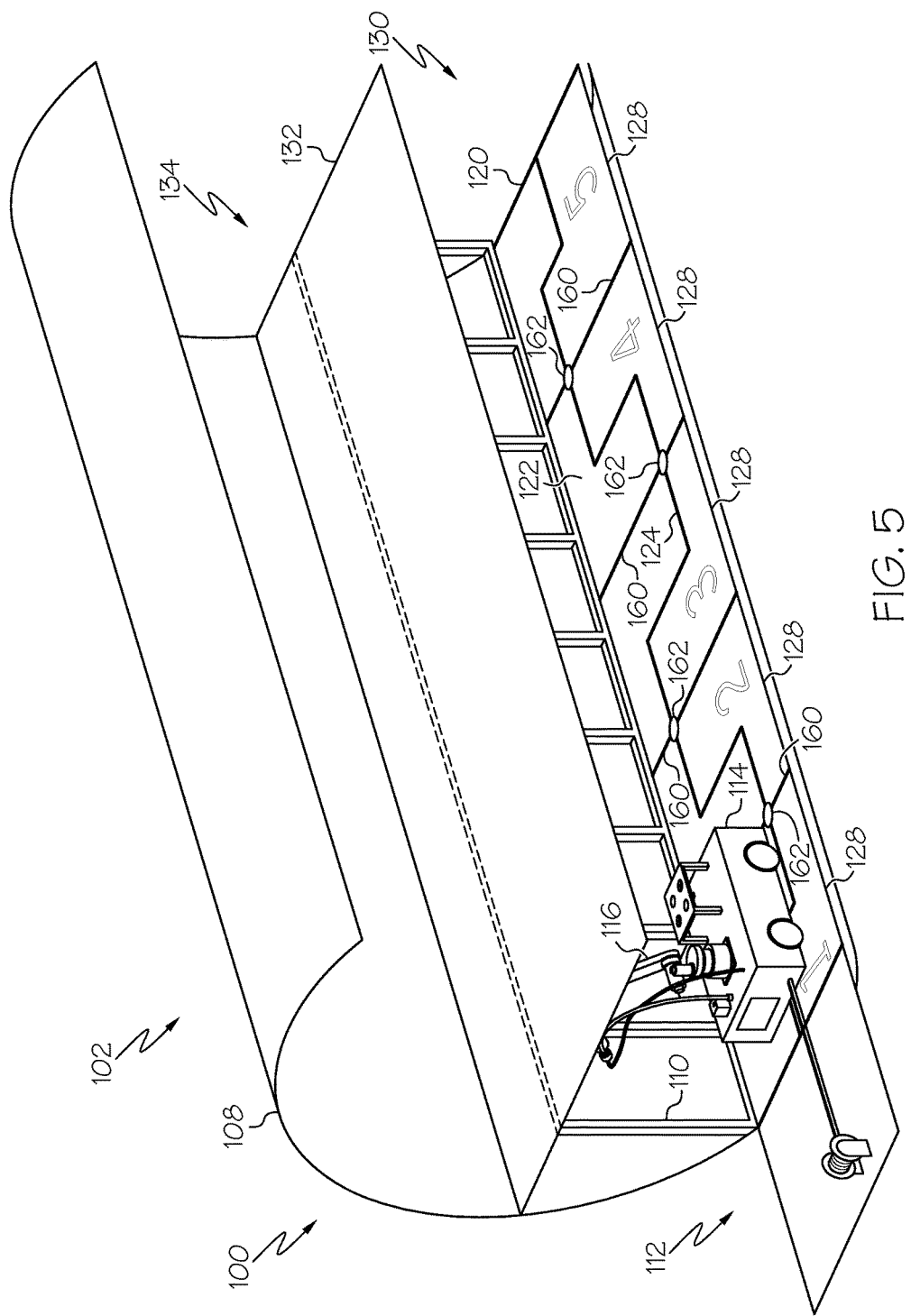
FIG. 5 is a schematic perspective view of the mobile robotic system of FIG. 1 illustrating another embodiment of the floor assembly including the reconfigurable pathway.

Referring to FIG. 1, and with reference to FIGS. 3-5, as one non-limiting example, manufactured article 104 may be aircraft 106. As one example, structure 102 may be a portion of fuselage 108 of aircraft 106. As another example, structure 102 may be support frame 110 (FIGS. 3-5) internal to fuselage 108.

Referring to FIG. 1, and with reference to FIGS. 2-5, one embodiment of mobile robotic system, generally designated 112, is disclosed. Mobile robotic system 112 operates within manufacturing environment 100 to perform various manufacturing operations on structure 102. As one example, mobile robotic system 112 includes automated guided vehicle ("AGV") 114, robotic arm 116 coupled to AGV 114, end effector 118 coupled to robotic arm 116 and floor assembly 120. As one example, floor assembly 120 includes support surface 122 and reconfigurable pathway 124. As one example, reconfigurable pathway 124 is configured to produce a magnetic field 126. AGV 114 is configured to travel on support surface 122 and follow reconfigurable pathway 124.

Referring to FIGS. 3-5, as one example implementation, floor assembly 120 may define a footprint within manufacturing environment 100. Reconfigurable pathway 124 may include a magnetic marker 150 producing magnetic field 126 and extending along a predetermined route (e.g., along floor assembly 120) within manufacturing environment 100. AGV 114 follows reconfigurable pathway 124 along the predetermined route to position AGV 114 at one or more predetermined locations relative to structure 102 (also referred to herein as stations 128).

As one example, floor assembly 120 is placed (e.g., removably placed) within structure 102. As another example, floor assembly 120 is placed (e.g., removably placed) on a floor of a manufacturing facility (e.g., within manufacturing environment 100), such that support surface 122 and reconfigurable pathway 124 are elevated above the floor of the manufacturing facility.

As one example, floor assembly 120 and, thus, reconfigurable pathway 124 is routed through manufacturing environment 100 to provide a desired travel path for AGV 114. For example, reconfigurable pathway 124 may be routed around equipment or machinery, proximate structure 102 on which a manufacturing operation is to be performed, through structure 102 on which a manufacturing operation is to be performed and the like. Thus, the operating environment of AGV 114 (e.g., manufacturing environment 100) (FIG. 1) is any environment in which support surface 122 of floor assembly 120 includes magnetic marker 150 that defines reconfigurable pathway 124.

Figure 2:
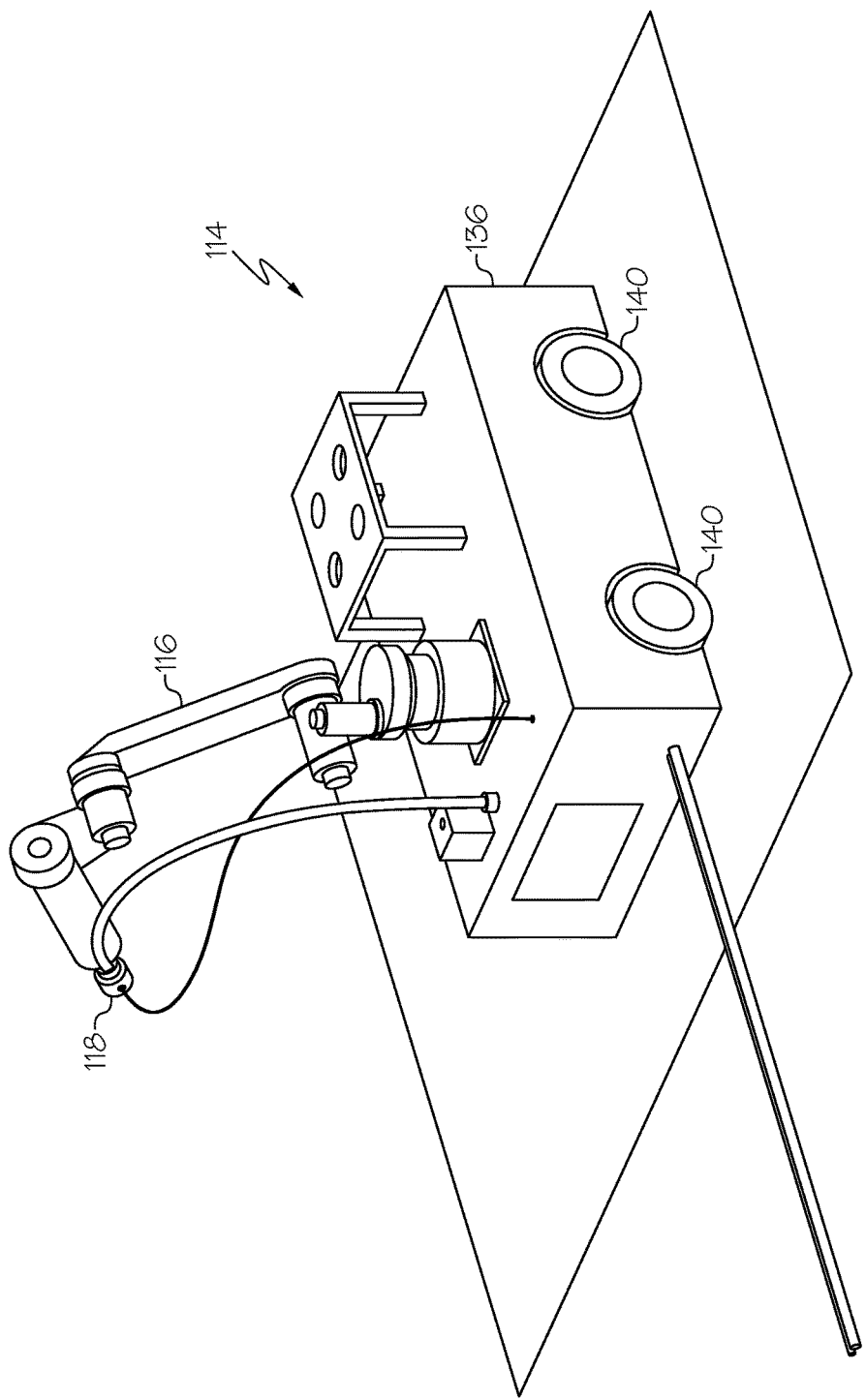
FIG. 2 is a schematic perspective view of an automated guided vehicle and robotic arm of FIG. 1.

Referring to FIG. 2, and with reference to FIG. 1, AGV 114 may have any size, shape, style, type, or configuration of a vehicle that is capable of driving along predetermined routes without a human operator. AGV 114 may be capable of supporting robotic arm 116. AGV 114 may vary from a small automatic cart up to a large vehicle.

As one example, robotic arm 116 includes a programmable mechanical arm. End effector 118 is coupled to an end of robotic arm 116. End effector 118 may include any tool or device capable of performing one or more manufacturing operations.

As one example, AGV 114 generally includes frame assembly (e.g., a body) 136 and powertrain 138 (e.g., an engine or motor and a drivetrain) (FIG. 1) to which wheels 140 are attached. As one example, AGV 114 includes guidance system 142 (FIG. 1) having the ability through any known technique to provide steering and directional control to or through wheels 140.

AGV 114 may include at least three wheels 140 (four wheels 140 are illustrated by example). As one example, at least one wheel 140 is a directional wheel for receiving steering input from controller 146 to provide directional control of AGV 114. As one example, two or more wheels 140 are omnidirectional wheels (also referred to as omni wheels or poly wheels) to provide directional control. The particular configuration of wheels 140 may vary depending upon, for example, the type of AGV 114, the type of support surface 122 of floor assembly 120 on which AGV 114 operates and the like.

Referring to FIG. 1, as one example, guidance system 142 includes magnetic sensor assembly 144 and controller 146. Magnetic sensor assembly 144 may include any combination of hardware and/or software that provides sensor readings pertaining to magnetic field 126 that is produced by magnetic marker 150 along reconfigurable pathway 124 located on floor assembly 120. As one example, magnetic sensor assembly 144 includes one or more magnetic field detectors 148 capable of, in combination with controller 146, determining at least one vector in the direction of reconfigurable pathway 124. Magnetic field detector 148 may include any sensor capable of providing the necessary information to determine the direction of reconfigurable pathway 124, for example, having the ability to determine the vector from the strength of magnetic field 126 along orthogonal axes. Non-limiting examples of magnetic field detector 148 may include a Hall effect sensor, a magnetoresistance sensor and the like.

Controller 146 includes any combination of electronic processing devices, memory devices, communication devices, input/output ("I/O") devices, and/or other known components and may perform various processing and/or communication related functions. As one example, controller 146 (e.g., via a processing device) processes information from a number of different sources, including sensor readings from magnetic sensor assembly 144. As one example, controller 146 includes one or more microcontrollers, microprocessors, central processing units ("CPUs"), application specific integrated circuits ("ASICs") or any other suitable processing device known in the art.

Guidance system 142 may perform a variety of tasks including, but not limited to, evaluating sensor readings and providing an output of the evaluation to some other device or system in AGV 114. As one example, a steering system (not explicitly identified) of AGV 114 requests information from guidance system 142 regarding the position of AGV 114 relative to reconfigurable pathway 124 and, in response to such a request, guidance system 142 provides the steering system with the requested position information.

As one example implementation, magnetic sensor assembly 144 evaluates different parts of magnetic field 126 produced by magnetic marker 150 (e.g., reconfigurable pathway 124). By doing this, magnetic sensor assembly 144 may provide controller 146 with information about magnetic field 126, such as the location of the center of magnetic field 126, the intensity of magnetic field 126, the strength of magnetic field 126 in certain directions, the width of magnetic field 126 and the like. Controller 146 may then determine the location of magnetic marker 150 and whether AGV 114 needs to make a course correction to remain along reconfigurable pathway 124.

Guidance system 142 may use magnetic sensor assembly 144 alone or in conjunction with other types of sensor systems to guide the course of AGV 114.

The location of magnetic sensor assembly 144 (e.g., magnetic field detector 148) on AGV 114 may vary depending upon various factors including, but not limited to, the ease of access to magnetic sensor assembly 144, the direction of travel of AGV 114 and the like. As non-limiting examples, magnetic sensor assembly 144 may be centered or off-centered on an underside of frame assembly 136 of AGV 114, may be located near a front, a middle or a rear of frame assembly 136 of AGV 114 or may extend across a portion of or the entire lateral width of frame assembly 136 of AGV 114.

Referring to FIGS. 6-9, and with reference to FIG. 1, magnetic marker 150 may be coupled to or integrated with floor assembly 120 to produce magnetic field 126 and form reconfigurable pathway 124. Use of a generally continuous magnetic marker 150 allows substantially constant sensing of magnetic field 126 (FIG. 1) by magnetic sensor assembly 144 (FIG. 1) of AGV 114 (FIG. 1) along reconfigurable pathway 124.

Figure 6:
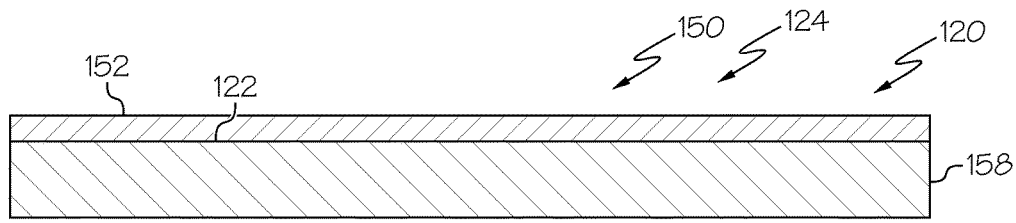
FIG. 6 is a schematic side elevational view, in section, of one embodiment of a magnetic marker of the reconfigurable pathway of the floor assembly of FIG. 1.
Figure 7:
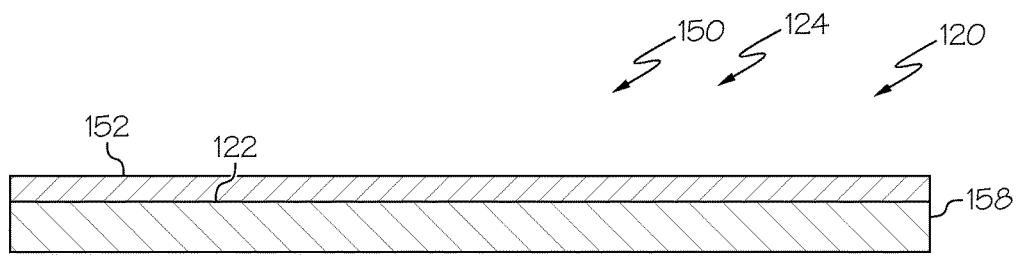
FIG. 7 is a schematic side elevational view, in section, of another embodiment of the magnetic marker of the reconfigurable pathway of the floor assembly of FIG. 1.

As one example, magnetic marker 150 may be any type of elongated, substantially continuous magnetic material or item applied to or set within support surface 122 of floor assembly 120. As one specific, non-limiting example, magnetic marker 150 is a relatively thin magnetic strip 152 (e.g., magnetic tape). As one example construction, and as illustrated in FIG. 6, magnetic strip 152 is coupled (e.g., adhered) to support surface 122 of floor assembly 120. As another example construction, and as illustrated in FIG. 7, magnetic strip 152 is integrated into floor assembly 120 just below or contiguous with support surface 122. As another specific, non-limiting example, magnetic marker 150 is magnetic paint 154 (FIG. 1). As one example (not explicitly illustrated), magnetic paint 154 is applied to support surface 122 of floor assembly 120. While it may be generally desirable for magnetic strip 152 or magnetic paint 154 to be continuous along reconfigurable pathway 124, minimal gaps or breaks (e.g., intentional or unintentional) may be included, for example, due to wear over time.

Figure 8:
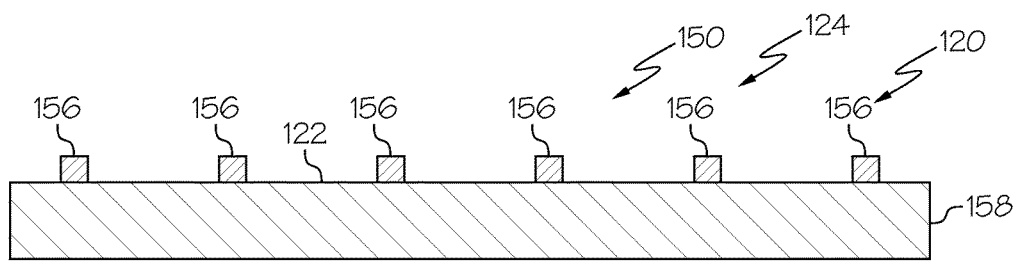
FIG. 8 is a schematic side elevational view, in section, of another embodiment of the magnetic marker of the reconfigurable pathway of the floor assembly of FIG. 1.
Figure 9:
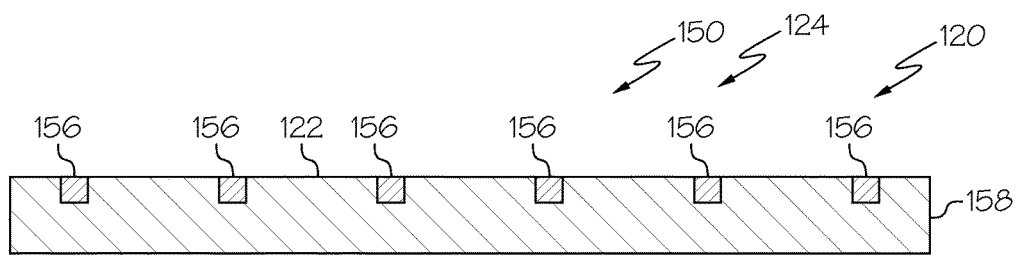
FIG. 9 is a schematic side elevational view, in section, of another embodiment of the magnetic marker of the reconfigurable pathway of the floor assembly of FIG. 1.

As another example, magnetic marker 150 may be any type of discrete magnetic elements applied to or set within support surface 122 of floor assembly 120. As one specific, non-limiting example, magnetic marker 150 is a plurality of magnets 156. As one example construction, and as illustrated in FIG. 8, magnets 156 are coupled to support surface 122 of floor assembly 120. As another example construction, and as illustrated in FIG. 9, magnets 156 are set into floor assembly 120 just below or contiguous with support surface 122. For example, holes or recesses (not explicitly identified in FIG. 9) are formed into support surface 122 (e.g., at least partially or completely through floor panel 158) and magnets 156 are secured within the holes or recesses, for example, by use of a potting compound. As one example, a potted insert (not explicitly illustrated) is coupled within floor panel 158 (e.g., within the hole formed through floor panel 158) and magnet 156 is coupled within or set within the potted insert.

In one example, magnets 156 may be spaced apart along reconfigurable pathway 124. The spaced-apart distance between adjacent magnets 156 may be limited to a distance sufficient to allow substantially constant sensing of magnetic field 126 (FIG. 1) by magnetic sensor assembly 144 (FIG. 1) of AGV 114 (FIG. 1) along reconfigurable pathway 124. The particular distance between adjacent magnets 156 may depend upon various factors including, but not limited to, the magnitude of magnetic field 126 produced by magnets 156, the sensitivity of magnetic sensor assembly and the like.

While the disclosed mobile robotic system 112 describes and illustrates reconfigurable pathway 124 of floor assembly 120 as including magnetic marker 150 providing magnetic field 126 and guidance system 142 of AGV 114 as including magnetic sensor assembly 114 configured to detect magnetic field 126, other implementations and methods are also contemplated. As one example (not explicitly illustrated), reconfigurable pathway 124 may include (or be defined by) an electrified wire proving magnetic filed 126 coupled to or set in each floor panel 158 forming floor assembly 120. In such an example, each segment 164 (e.g., of each floor panel 158 forming reconfigurable pathway 124) formed by the electrified wire may be electrically coupled to a preceding and a successive segment 164 of adjacent floor panels 158. As another example, (not explicitly illustrated), reconfigurable pathway 124 may include (or be defined by) a wire providing a radio frequency ("RF") signal and guidance system 142 of AGV 114 may include one or more RF sensors configured to detect the RF signal.

Further, guidance system 142 of AGV 114 may include additional components, devices or systems configured to navigate AGV 114 along reconfigurable pathway 124. As examples (not explicitly illustrated), AGV 114 may also be guided by a laser and target system, an inertial (e.g., gyroscopic) navigation system and the like.

Referring to FIGS. 4 and 5, as one example, floor assembly 120 includes one or more dividers 160 (e.g., divider lines). Each divider 160 is also configured to produce magnetic field 126. Each divider 160 includes magnetic marker 150 (e.g., magnetic strip 152, magnetic paint 154, magnets 156) coupled to or integrated with floor assembly 120 to produce magnetic field 126. As one example, each divider 160 intersects reconfigurable pathway 124 to partition floor assembly 120 into stations 128. An intersection 162 of each divider 160 and reconfigurable pathway 124 may define a predetermined location where AGV 114 will stop in order to perform one or more manufacturing operations on structure 102, for example, by robotic arm 116.

In one example implementation, AGV 114 follows reconfigurable pathway 124 to intersection 162 of reconfigurable pathway 124 and divider 160. Guidance system 142 may be preprogrammed to stop travel of AGV 114 along reconfigurable pathway 124 based on an evaluation of magnetic fields 126 produced by magnetic marker 150 of reconfigurable pathway 124 and magnetic marker 150 of divider 160 at intersection 162, for example, by magnetic sensor assembly 144 and controller 146. Upon completion of one or more manufacturing operations, AGV 114 may then continue travel along reconfigurable pathway 124 until guidance system 142 detects another intersection 162.

The number of dividers 160 and, thus, the number of stations 128 of floor assembly 120 may depend on various factors including, but not limited to, the type and/or size of structure 102 on which the manufacturing operation will be performed, the type of manufacturing operation to be performed, the type and/or range of robotic arm 116 and the like. As one non-limiting example, and as illustrated in FIGS. 4 and 5, floor assembly 120 may include four dividers 160 partitioning floor assembly 120 into five stations 128 (identified as 1, 2, 3, 4, 5).

Similarly, the location of dividers 160 on floor assembly 120 and, thus, the location of intersections 162 of divider 160 and reconfigurable pathway 124 may vary depending upon various factors including, but not limited to, the type and/or size of structure 102 on which the manufacturing operation will be performed, the type of manufacturing operation to be performed, the type and/or range of robotic arm 116 and the like. Dividers 160 may be substantially evenly spaced apart forming generally equally sized stations 128 or dividers 160 may be unevenly spaced apart forming stations 128 of different sizes.

While FIGS. 4 and 5 illustrate dividers 160 extending completely across a width of floor assembly 120, the overall length of each divider 160 may depend on various factors including, but not limited to, the type of magnetic sensor assembly 144, the location of magnetic sensor assembly 144 on frame assembly 136 of AGV 114, the number of magnetic sensor assemblies 144 and the like. In fact, divider 160 may not need to physically intersect with reconfigurable pathway 124. For example, divider 160 may extend a portion of the width of floor assembly 120 and may include a break or a gap through which reconfigurable pathway 124 extends. Guidance system 142 may include one or more additional magnetic sensor assembly 144 dedicated to detecting and evaluating magnetic field 126 produced by magnetic marker 150 of divider 160.

Figure 10:
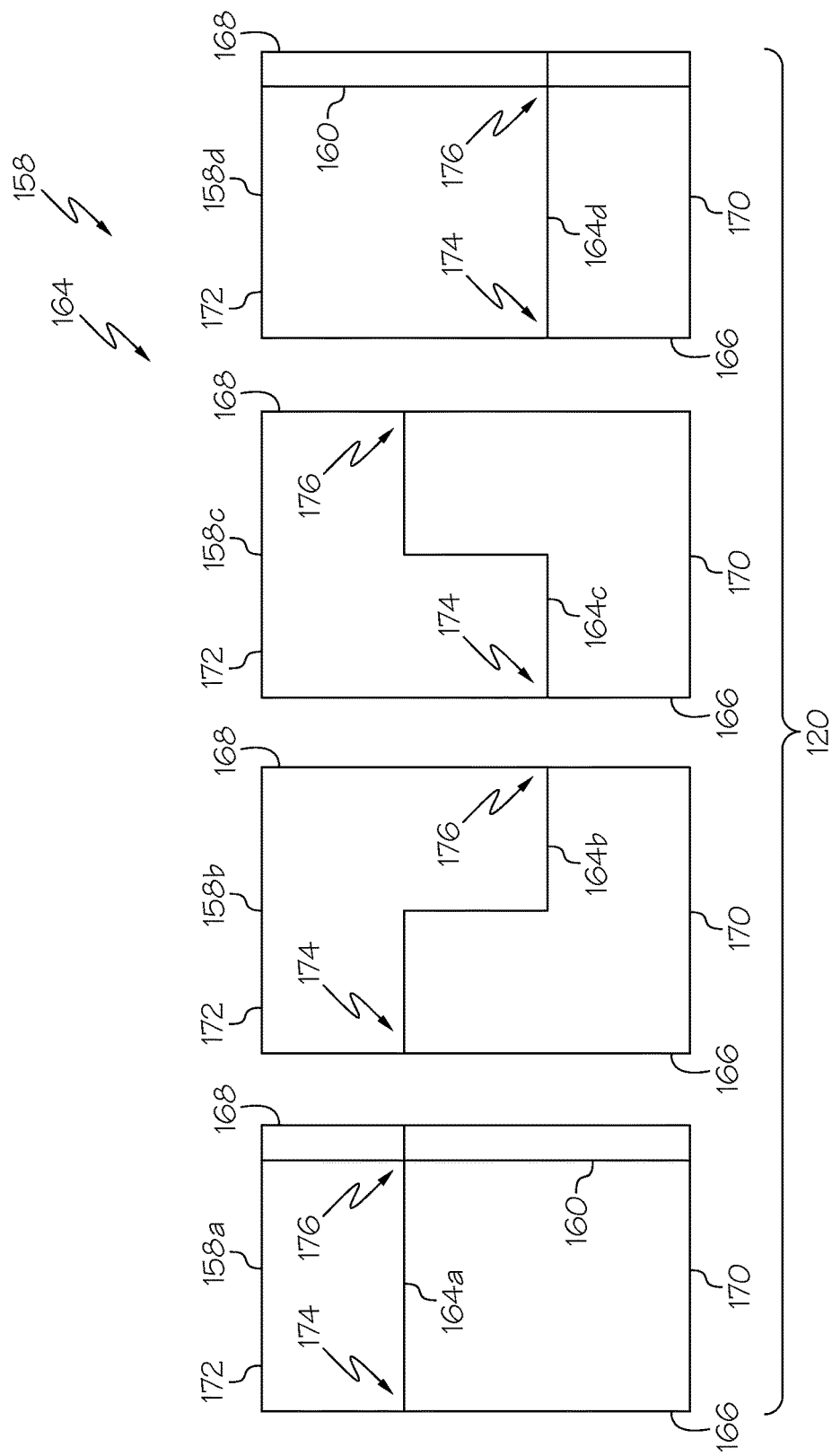
FIG. 10 is a schematic top plan view of floor panels of the floor assembly of FIG. 1.
Figure 11:
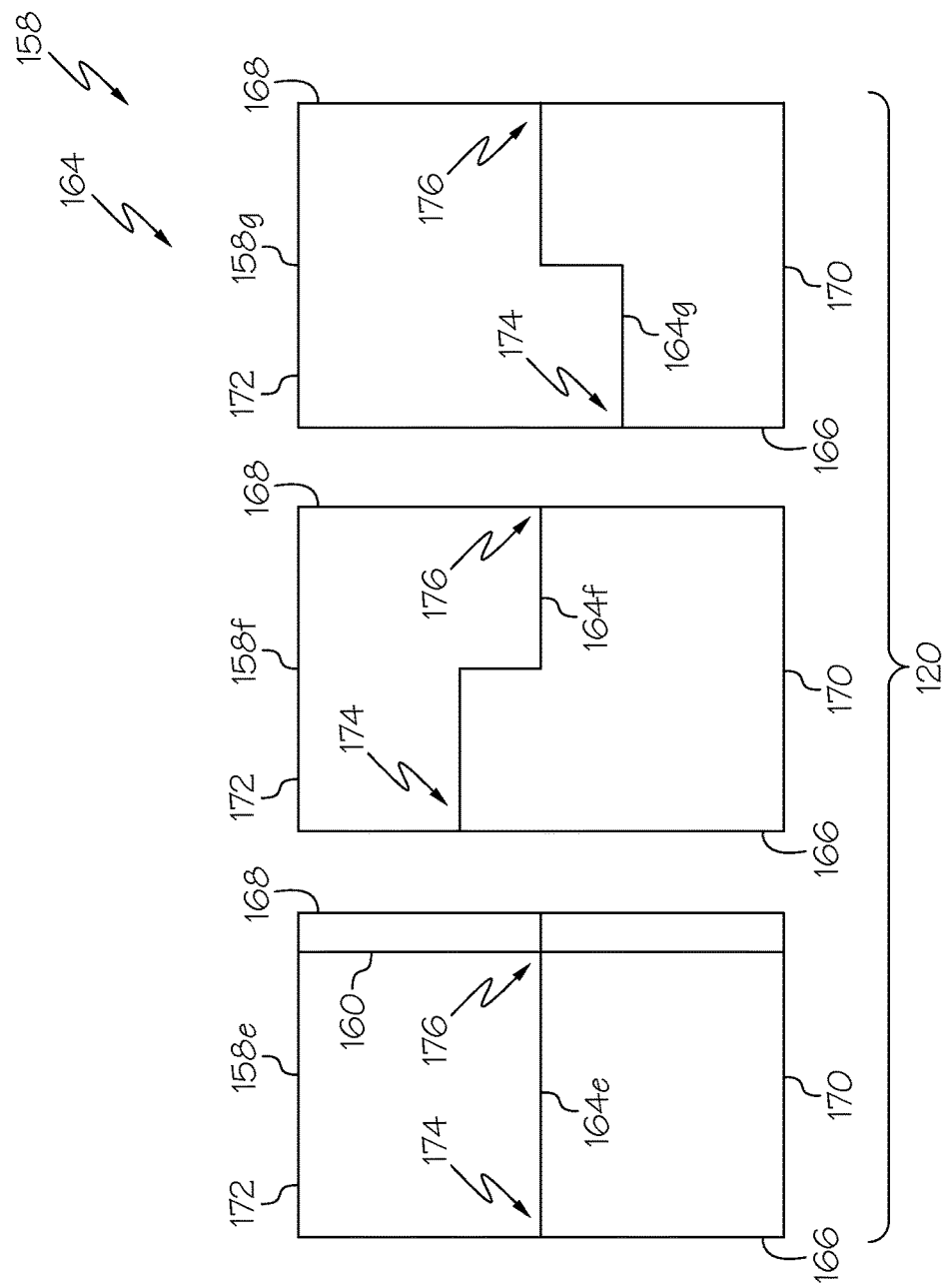
FIG. 11 is a schematic top plan view of floor panels of the floor assembly of FIG. 1.

Referring to FIGS. 10 and 11, and with reference to FIG. 1, as one example, floor assembly 120 includes a plurality of floor panels 158 (floor panels 158 are identified individually as floor panel 158a, floor panel 158b, floor panel 158c, floor panel 158d, floor panel 158e, floor panel 158f and floor panel 158g). As one example, floor panels 158 include segments 164 of reconfigurable pathway 124 (segments 164 are identified individually as segment 164a, segment 164b, segment 164c, segment 164d, segment 164e, segment 164f and segment 164g). Each segment 164 defines a portion of reconfigurable pathway 124 (FIG. 1). Each segment 164 includes magnetic marker 150.

As one example, floor panels 158 (e.g., forming floor assembly 120) are placed (e.g., removably placed) within structure 102. As another example, floor panels 158 (e.g., forming floor assembly 120) are placed (e.g., removably placed) on a floor of a manufacturing facility (e.g., within manufacturing environment 100), such that support surface 122 and reconfigurable pathway 124 are elevated above the floor of the manufacturing facility.

Certain individual floor panels 158 may be chosen to create reconfigurable pathway 124 based on a predetermined travel path of AGV 114. Similarly, certain individual floor panels 158 may be replaced or interchanged with other floor panels 158 in order to alter one or more portions of reconfigurable pathway 124.

As one example, floor assembly 120 includes a plurality of floor panels 158. Each floor panel 158 includes segment 164 of reconfigurable pathway 124. An associated plurality of segments 164 defines reconfigurable pathway 124. Reconfigurable pathway 124 is formed by a sequential placement of the plurality of floor panels 158 to associate the plurality of segments 164 and generate a travel path for AGV 114. A different sequential placement of the plurality of floor panels 158 associates a different plurality of segments 164 and generates a different travel path for AGV 114.

As one example, each floor panel 158 includes first (e.g., rear) side 166, second (e.g., front) side 168 opposite first side 166, third (e.g., right) side 170 and fourth (e.g., left) side 172 opposite third side 170. Each segment 164 may extend from first side 166 to second side 168 and be positioned between third side 170 and fourth side 172. For example, each segment 164 may include first end 174 commencing at first side 168 and second end 176 terminating at second side 168.

Unless otherwise indicated, the terms "first," "second," "third," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As one example, reconfigurable pathway 124 is formed by a sequential placement (e.g., consecutive or in a logical order) of the plurality of floor panels 158 to associate (e.g., join or connect) first end 174 of segment 164 of one of the plurality of floor panels 158 with second end 176 of segment 164 of an adjacent one of the plurality of floor panels 158 and generate the travel path for AGV 114. A different sequential placement of the plurality of floor panels 158 generates a different travel path for AGV 114.

Reconfigurable pathway 124 defines the travel path of AGV 114 along floor assembly 120 and within manufacturing environment 100. Accordingly, segment 164 defines the travel path of AGV 114 along floor panel 158 (e.g., the travel path of AGV 114 is generated by reconfigurable pathway 124 that is formed by an associated plurality of segments 164).

As one example, segments 164 of adjacent floor panels 158 are aligned to form reconfigurable pathway 124 by consecutively (e.g., continuously) placing floor panels 158. During set up of floor assembly 120, for example, proximate structure 102 (FIGS. 3-5), floor panels 158 may be consecutively placed by abutting first (e.g., rear) side 166 of one of floor panels 158 to second (e.g., front) side 168 of a preceding one of floor panels 158 and aligning second end 176 of segment 164 the one of floor panels 158 with first end 174 of segment 164 of the preceding one of floor panels 158.

In one example construction, floor panels 158 may be interconnected together to form floor assembly 120. In another example construction, floor panels 158 may not be interconnected to each other. As one example, floor panels 158 may be placed on (e.g., laid down on) an underlying support surface (e.g., the floor of a manufacturing facility, a surface of structure 102, etc.) Each floor panel 158 may be labeled (e.g., numerically) and laid down in a predetermined order (e.g., as defined by its respective numerical identification) to appropriately form reconfigurable pathway 124.

Each floor panel 158 may be formed (e.g., made) of any suitable material or combination of materials. As one general, non-limiting example, each floor panel 158 includes a core (e.g., a honeycomb core) and two opposing face sheets coupled to the core. As one specific, non-limiting example, the honeycomb core and the face sheets may be made of aramid fibers (e.g., a Nomex® honeycomb core and Kevlar® face sheets).

Referring to FIGS. 10 and 11, segments 164 of certain floor panels 158 may be straight to provide a straight travel path of AGV 114 along floor panel 158 (e.g., a portion of floor assembly 120). For example, first end 174 and second end 176 of segment 164 may be aligned.

Referring to FIG. 11, as one example, segment 164e may be straight and positioned generally centrally between third side 170 and fourth side 172 to position the travel path of AGV 114 along a middle of floor panel 158e.

Referring to FIG. 10, as another example, segment 164a may be straight and positioned toward fourth side 172 of floor panel 158a to position the travel path of AGV 114 toward fourth side 172 (e.g., the left side) of floor panel 158a. As another example, segment 164d may be straight and positioned toward third side 170 of floor panel 158d to position the travel path of AGV 114 toward third side 170 (e.g., the right side) of floor panel 158d.

Referring to FIGS. 10 and 11, segments 164 of certain floor panels 158 may have varying shapes configured to change the travel path of AGV 114 along floor panel 158 (e.g., a portion of floor assembly 120). For example, first end 174 and second end 176 of segment 164 may be offset.

Referring to FIG. 10, as one example, segment 164b may transition from fourth side 172 to third side 170 of floor panel 158b to transition the travel path of AGV 114 from toward fourth side 172 to toward third side 170 of floor panel 158b. For example, floor panel 158b may be used between floor panel 158a and floor panel 158d. As another example, segment 164c may transition from third side 170 to fourth side 172 of floor panel 158c to transition the travel path of AGV 114 from toward third side 170 to toward fourth side 172 of floor panel 158c. For example, floor panel 158c may be used between floor panel 158d and floor panel 158a.

Referring to FIG. 11, as another example, segment 164f may transition from fourth side 172 to the middle of floor panel 158f to transition the travel path of AGV 114 from toward fourth side 172 to the middle of floor panel 158f. For example, floor panel 158f may be used between floor panel 158c or floor panel 158a and floor panel 158e. Similarly, when floor panel 158f is rotated 180-degrees, segment 164f may transition from the middle to fourth side 172 of floor panel 158f. For example, floor panel 158f may be used between floor panel 158e and floor panel 158b or floor panel 158a. As yet another example, segment 164g may transition from third side 170 to the middle of floor panel 158g to transition the travel path of AGV 114 from toward third side 170 to the middle of floor panel 158g. For example, floor panel 158g may be used between floor panel 158b or floor panel 158d and floor panel 158e. Similarly, when floor panel 158g is rotated 180-degrees, segment 164g may transition from the middle to third side 170 of floor panel 158g. For example, floor panel 158f may be used between floor panel 158e and floor panel 158c or floor panel 158d.

As one example, and as best illustrated in FIGS. 3 and 4, a plurality of floor panels 158 (not specifically identified in FIGS. 3 and 4) each including a centrally positioned segment 164 (not specifically identified in FIGS. 3 and 4), such as floor panel 158e including segment 164e (FIG. 11), are used to form a generally straight reconfigurable pathway 124 and, thus, travel path of AGV 114 along the length of floor assembly 120.

As another example, and as best illustrated in FIG. 5, a plurality of floor panels 158 (not specifically identified in FIG. 5) including variously positioned segments 164 and/or variously shaped segments 164 (not specifically identified in FIG. 5), such as floor panel 158b including segment 164b, floor panel 158c including segment 164c, floor panel 158a including segment 164a and/or floor panel 158d including segment 164d, are used to form a varying reconfigurable pathway 124 and, thus, travel path of AGV 114 along the length of floor assembly 120. Accordingly, AGV 114 may be moved closer to or farther away from structure 102, for example, to perform one or more manufacturing operations with robotic arm 116, while traveling along reconfigurable pathway 124.

While the shape of segments 164 configured to transition between third side 170, fourth side 172 and the middle of floor panel 158 (e.g., segment 164b of floor panel 158b, segment 164c of floor panel 158c, segment 164f of floor panel 158f and segment 164g of floor panel 158g) are illustrated in FIGS. 10 and 11 as including three straight portions disposed perpendicularly to each other, the shape of segments 164 configured to transition between third side 170, fourth side 172 and the middle of floor panel 158 may alternatively be curved.

While not explicitly illustrated, as another example, segment 164 may be shaped to allow floor assembly 120 and reconfigurable pathway 124 to form a bend or turn (e.g., 90-degree turn), for example, to change the direction of travel of AGV 114. As one example, segment 164 may extend from second side 168 to third side 170 or fourth side 172 to change the direction of reconfigurable pathway 124. For example, first end 174 of segment may commence at first side 166 and second end 176 may terminate at third side 170 (e.g., to form a right turn) or second end 176 may terminate at fourth side 172 (e.g., to form a left turn). The shape of a direction changing segment 164 may include two straight portions disposed perpendicularly to each other or may be curved.

Referring to FIGS. 10 and 11, and with reference to FIGS. 4 and 5, any one or more of floor panels 158 (e.g., floor panel 158a, floor panel 158b, floor panel 158c, floor panel 158d, floor panel 158e, floor panel 158f and floor panel 158g) may include one or more dividers 160 (FIGS. 4 and 5). Divider 160 may extend at least partially between third side 170 and fourth side 172 of floor panel 158. Divider 160 may be positioned at any location between first side 166 and second side 168 of floor panel 158.

While FIGS. 10 and 11 illustrate only floor panels 158 including straight segments 164 (e.g., floor panel 158a including segment 164a, floor panel 158d including segment 164d and floor panel 158e including segment 164e) as including divider 160, floor panels 158 including shaped segments 164 configured to transition the travel path of AGV 114 (e.g., floor panel 158*b* including segment 164*b*, floor panel 158*c* including segment 164*c*, floor panel 158*f* including segment 164*f* and floor panel 158*g* including segment 164*g*) may also include divider 160.

The total number of floor panels 158 forming floor assembly 120 and/or the type (e.g., shape) of segment 164 of each floor panel 158 forming reconfigurable pathway 124 may depend on various factors including, but not limited to, the overall length of floor assembly 120, the length of each floor panel 158, the location and/or position of structure 102 relative to reconfigurable pathway 124 and the like.

Referring to FIGS. 3-5, floor assembly 120 may be located proximate (e.g., at or near) structure 102 or within structure 102 such that AGV 114 may appropriately position robotic arm 116 relative to structure 102 to perform one or more manufacturing operations on structure 102. As one example, floor assembly 120 is positioned next to support frame 110 of fuselage 108. As another example, floor assembly 120 is positioned within fuselage 108 and extend longitudinally through fuselage 108, for example, to position AGV 114 and robotic arm 116 next to support frame 110 located within fuselage 108.

The location and/or position of floor assembly 120 relative to structure 102 may depend on various factors including, but not limited to, the type of structure 102 being manufactured, the type of manufacturing operation being performed on structure 102 and the like. In FIGS. 3-5, a portion of fuselage 108 is shown broken away in order to more clearly illustrate mobile robotic system 112 (e.g., floor assembly 120, AGV 114 and robotic arm 116).

Accordingly, mobile robotic system 112 may be particularly beneficial when performing manufacturing operations on structure 102 in areas where space is limited or access is limited, for example, when assembling support frame 110 within an interior of lower lobe 130 of fuselage 108. During manufacture of fuselage 108, passenger compartment floor 132 may divide fuselage 108 into upper lobe 134 and lower lobe 130. Space and access to support frame 110 may be limited due to the enclosed nature of fuselage 108 and passenger compartment floor 132.

Mobile robotic system 112 may also be particularly beneficial when a temporary, reconfigurable or removable travel path for AGV 114 may be desired. While the disclosed mobile robotic system 112 is described herein relating to the performance of various manufacturing operations on structure 102, for example, by robotic arm 116, the disclosed floor assembly 120 including reconfigurable pathway 124 may be used for any other purpose in which a temporary and/or reconfigurable travel path for AGV 114 may be required or desired, such as transporting robotic arm 116 into an area subject to change or transporting materials to temporary work locations and the like.

Referring to FIG. 12, and with reference to FIGS. 1-11, one embodiment of method, generally designated 200, for guiding mobile robotic system 112 is disclosed. Modifications, additions, or omissions may be made to method 200 without departing from the scope of the present disclosure. Method 200 may include more, fewer, or other steps. Additionally, steps may be performed in any suitable order.

Referring to FIG. 12, and with reference to FIGS. 1 and 3-5, in one example implementation, method 200 includes the step of determining the travel path of AGV 114, as shown at block 202. As one example, the travel path may be determined by the combination of locations where one or more manufacturing operations will be performed on structure 102. As one non-limiting example, and as illustrated in FIGS. 3-5, the travel path for AGV 114 extends through fuselage 108 alongside support frame 110, such that AGV 114 travels through fuselage 108 to position robotic arm 116 proximate support frame 110 and to perform the manufacturing operation.

Referring to FIG. 12, and with reference to FIGS. 1,3-5, 10 and 11, in one example implementation, method 200 includes the step of forming floor assembly 120, as shown at block 204. As one example, floor assembly 120 includes reconfigurable pathway 124 producing magnetic field 126. Floor assembly 120 is formed (e.g., constructed) such that reconfigurable pathway 124 matches the travel path of AGV 114, which was previously determined (block 202). Thus, upon formation of floor assembly 120, reconfigurable pathway 124 generates the travel path for AGV 114.

Referring to FIG. 12, and with reference to FIGS. 1 and 3-5, in one example implementation, method 200 includes the step of detecting, by AGV 114, magnetic field 126 produced by reconfigurable pathway 124, as shown at block 206. As one example, reconfigurable pathway 124 include magnetic marker 150 configured to produce or generate magnetic field 126. Magnetic marker 150 may actively or passively generate magnetic field 126. As one example, AGV 114 includes guidance system 142. Guidance system 142 may include magnetic sensor assembly 144 configured to detect magnetic field 126.

Referring to FIG. 12, and with reference to FIGS. 1 and 3-5, in one example implementation, method 200 includes the step of navigating AGV 114 along reconfigurable pathway 124, as shown at block 208. As one example, guidance system 142 of AGV 114 includes controller 146 in communication with magnetic sensor assembly 144. Magnetic sensor assembly 144 may generate and transmit detection signals related to magnetic field detection to controller 146. Controller 146 may receive and process the detection signals from magnetic sensor assembly 144 and generate and transmit guidance (e.g., steering) signals to wheels 140 of AGV 114 to directionally steer AGV 114.

As one example, and as illustrated in FIGS. 3-5, AGV 114 travels on support surface 122 of floor assembly 120 and follows reconfigurable pathway 124 of floor assembly 120 through fuselage 108. As one example, and as illustrated in FIGS. 3 and 4, reconfigurable pathway 124, for example, as determined by the desired travel path of AGV 114, extends straight through fuselage 108 at an equal distance from support frame 110. As another example, and as illustrated in FIG. 5, reconfigurable pathway 124, for example, as determined by the desired travel path of AGV 114, extends through fuselage 108 at varying distances from support frame 110. For example, reconfigurable pathway 124 may be configured to position AGV 114 and, thus, robotic arm 116 closer to a left side of fuselage 108 when manufacturing operations of being performed on left side support frames 110. As AGV 114 traverses reconfigurable pathway 124, reconfigurable pathway 124 may be configured to position AGV 114 and, thus, robotic arm 116 closer to a right side of fuselage 108 when manufacturing operations of being performed on right side support frames 110.

Referring to FIG. 12, and with reference to FIGS. 1, 3-5, 10 and 11, in one example implementation, method 200 includes the step of placing a plurality of floor panels 158 together to form floor assembly 120, as shown at block 210. As one example, the plurality of floor panels 158 is placed sequentially (e.g., consecutively or in a logical order) to form floor assembly 120 (block 204). Each floor panel 158 includes segment 164 of reconfigurable pathway 124. Thus, sequentially placing the plurality of floor panels 158 associates a plurality of segments 164 to form reconfigurable pathway 124 and generate the travel path for AGV 114.

Referring to FIG. 12, and with reference to FIG. 1, in one example implementation, method 200 includes the step of differently placing (e.g., in a different sequence) the plurality of floor panels 158 to form floor assembly 120, as shown at block 212. As one example, one or more floor panels 158 may be interchanged (e.g., removed and replaced) to alter reconfigurable pathway 124. Thus, sequentially placing the plurality of floor panels 158 differently (e.g., in a different order or sequence) associates a different plurality of segments 164 and generates a different travel path for AGV 114.

Referring to FIG. 12, and with reference to FIG. 1, in one example implementation, method 200 includes the step of removing floor panels 158 and, thus floor assembly 120 following completion of the manufacturing operations performed on structure 102, as shown at block 214.

Examples of the present disclosure may be described in the context of aircraft manufacturing and service method 1100 as shown in FIG. 13 and aircraft 1200 as shown in FIG. 14. Aircraft 1200 may be one example of aircraft 106 illustrated in FIG. 1.

During pre-production, the illustrative method 1100 may include specification and design, as shown at block 1102, of aircraft 1200 and material procurement, as shown at block 1104. During production, component and subassembly manufacturing, as shown at block 1106, and system integration, as shown at block 1108, of aircraft 1200 may take place. Thereafter, aircraft 1200 may go through certification and delivery, as shown block 1110, to be placed in service, as shown at block 1112. While in service, aircraft 1200 may be scheduled for routine maintenance and service, as shown at block 1114. Routine maintenance and service may include modification, reconfiguration, refurbishment, etc. of one or more systems of aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 14, aircraft 1200 produced by illustrative method 1100 may include airframe 1202 with a plurality of high-level systems 1204 and interior 1206. Examples of high-level systems 1204 include one or more of propulsion system 1208, electrical system 1210, hydraulic system 1212 and environmental system 1214. Any number of other systems may be included. Although an aerospace example is shown, the principles disclosed herein may be applied to other industries, such as the automotive industry, the marine industry, the construction industry or the like.

The systems, apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the apparatus, systems and methods, or combination thereof may be utilized during production stages (blocks 1108 and 1110). Similarly, one or more examples of the apparatus and methods, or a combination thereof, may be utilized, for example and without limitation, while aircraft 1200 is in service (block 1112) and during maintenance and service stage (block 1114).

Although various embodiments of the disclosed system, apparatus and methods have been shown and described, modifications may occur to those skilled in the art upon reading the specification. The present application includes such modifications and is limited only by the scope of the claims.

What is claimed is:

1. A mobile robotic system comprising:
an automated guided vehicle comprising:
a frame;
a powertrain;
wheels operatively coupled with said power train and operable to move said automated guided vehicle upon a support surface; and
a guidance system configured to steer said automated guided vehicle via selective directional control of said wheels; and
a floor assembly defining a reconfigurable continuous pathway, along which said automated guided vehicle is steered, said floor assembly comprising a plurality of floor panels that are connected together to form said support surface, upon which said automated guided vehicle moves, each one of said floor panels comprising a guidance marker that defines a segment of said reconfigurable continuous pathway; and wherein:
said floor panels are selectively arranged so that said guidance marker of each one of said floor panels is aligned with said guidance marker of an adjacent one of said floor panels and a plurality of segments form said reconfigurable continuous pathway; and
said guidance system is configured to detect said guidance marker of each one of said floor panels so that said automated guided vehicle automatically follows said reconfigurable continuous pathway while on said support surface.

2. The system of claim 1 further comprising:
a robotic arm coupled to said frame of said automated guided vehicle; and
an end effector coupled to said robotic arm, wherein said end effector is configured to perform one or more manufacturing operations on a structure.

3. The system of claim 2 wherein said floor assembly is configured to be arranged within said structure.

4. The system of claim 1 wherein said guidance marker comprises a magnetic marker producing a magnetic field, and wherein said guidance system comprises a magnetic sensor configured to detect said magnetic field and direct said automated guided vehicle along said magnetic marker of each one of said floor panels.

5. The system of claim 4 wherein said magnetic marker comprises a magnetic strip.

6. The system of claim 4 wherein said magnetic marker is coupled to said support surface.

7. The system of claim 4 wherein:
said magnetic marker is a first magnetic marker and said magnetic field is a first magnetic field;
at least one of said floor panels further comprises a second magnetic marker producing a second magnetic field that defines a divider of said reconfigurable continuous pathway; and
said divider intersects said segment to partition said floor assembly into stations.

8. The system of claim 7 wherein said magnetic sensor of said guidance system is configured to detect said second magnetic field and stop said automated guided vehicle along said reconfigurable continuous pathway at an intersection of said divider and said segment.

9. The system of claim 1 wherein, with said floor panels selectively arranged in a first arrangement, a plurality of guidance markers of said floor panels are sequentially positioned to form a first configuration of said segments of said reconfigurable continuous pathway that defines a first travel path for said automated guided vehicle.

10. The system of claim 9 wherein, with said floor panels selectively arranged in a second arrangement, said guidance markers of said floor panels are sequentially arranged to form a second configuration of said segments of said reconfigurable continuous pathway that defines a second travel path for said automated guided vehicle that is different than said first travel path.

11. The system of claim 1 wherein said plurality of floor panels is configured to be removably placed on a floor of a manufacturing facility, and wherein said support surface and said reconfigurable continuous pathway are elevated above said floor of said manufacturing facility.

12. A method for guiding a mobile robotic system comprising:
determining a travel path of an automated guided vehicle, said automated guided vehicle comprising a frame, a powertrain, wheels operatively coupled with said power train and operable to move said automated guided vehicle upon a support surface, and a guidance system configured to steer said automated guided vehicle via selective directional control of said wheels;
selectively arranging a plurality of floor panels of a floor assembly to form said support surface, upon which said automated guided vehicle moves, and to define a continuous pathway, along which said automated guided vehicle is steered, that matches said travel path, each one of said floor panels comprising a guidance marker that defines a segment of said reconfigurable continuous pathway;
connecting said floor panels together so that said guidance marker of each one of said floor panels is aligned with said guidance marker of an adjacent one of said floor panels and a plurality of segments form said continuous pathway;
detecting, by said guidance system of said automated guided vehicle, said guidance marker of each one of said floor panels; and
automatically navigating said automated guided vehicle along said travel path by following said continuous pathway while on said support surface.

13. The method of claim 12 further comprising:
determining a second travel path of said automated guided vehicle that is different than said travel path;
selectively rearranging said floor panels to form said support surface, upon which said automated guided vehicle moves, and to define a second continuous pathway that matches said second travel path;
connecting said floor panels together so that said guidance marker of each one of said floor panels is aligned with said guidance marker of an adjacent one of said floor panels and said plurality of segments form said second continuous pathway;
detecting, by said guidance system of said automated guided vehicle, said guidance marker of each one of said floor panels; and
automatically navigating said automated guided vehicle along said second travel path by following said second continuous pathway while on said support surface.

14. The system of claim 4 wherein said magnetic marker comprises a plurality of magnets.

15. The system of claim 4 wherein said magnetic marker comprises magnetic paint.

16. The system of claim 1 wherein:
each one of said segments comprises a first end located at a first side of a corresponding one of said floor panels and a second end located at a second side of said corresponding one of said floor panels; and
selective arrangement of said floor panels aligns said first end of each one of said segments with said second end of an adjacent one of said segments.

17. The system of claim 16 wherein said first end of at least one of said segments is coaxially aligned with said second end of said at least one of said segments.

18. The system of claim 16 wherein said first end of at least one of said segments is axially offset from said second end of said at least one of said segments.

19. The system of claim 4 wherein said magnetic marker is located within said floor assembly proximate to said support surface.

20. The system of claim 3 wherein:
said guidance marker is a first guidance marker;
at least one of said floor panels further comprises a second guidance marker that defines a divider of said reconfigurable continuous pathway;
said divider intersects said segment to partition said floor assembly into stations; and
said guidance system is configured to detect said second guidance marker of said at least one of said floor panels so that said automated guided vehicle stops at an intersection of said divider and said segment.

21. The system of claim 20 wherein said intersection of said divider and said segment is selectively located relative to said structure so that said end effector is located to perform said one or more manufacturing operations on said structure when said automated guided vehicle stops.

22. The method of claim 12 further comprising:
detecting, by said guidance system of said automated guided vehicle, a second guidance marker of at least of said floor panels that defines a divider of said continuous pathway, said divider intersects said segment to partition said floor assembly into stations; and
automatically stopping said automated guided vehicle along said travel path at an intersection of said divider and said segment.

* * * * *